United States Patent [19]
Emanuel

[11] 3,818,374
[45] June 18, 1974

[54] CHAIN REACTION HCL CHEMICAL LASER
[75] Inventor: George Emanuel, Torrance, Calif.
[73] Assignee: TRW Inc., Redondo Beach, Calif.
[22] Filed: Mar. 7, 1973
[21] Appl. No.: 339,013

[52] U.S. Cl. ............................... 331/94.5, 330/4.3
[51] Int. Cl. ............................................ H01s 3/22
[58] Field of Search ...................... 331/94.5; 330/4.3

[56] References Cited
UNITED STATES PATENTS
3,688,215   8/1972   Spencer et al. ................... 331/94.5
3,701,045   10/1972  Bronfin et al. .................... 331/94.5

Primary Examiner—William L. Sikes
Attorney, Agent, or Firm—Daniel T. Anderson; Alan D. Akers; Edwin A. Oser

[57] ABSTRACT

A chemical laser having good chemical efficiency and power level produced by chain reacting in an optical cavity chlorine gas with hydrogen or deuterium gas in a compact combustion driven chemical laser. An inorganic fluorine-source gas, an inorganic hydrogen-source gas, and an inorganic chlorine-source gas are introduced into the combustion chamber of a chemical laser whereupon the hydrogen-source gas and the fluorine-source gas react to heat the chlorine-source gas and produce atomic and diatonic chlorine. Atomic and predominantly molecular chlorine gas, together with the other combustion products, are driven into the laser cavity at supersonic velocities where the chlorine gas reacts with hydrogen or deuterium gas.

In the laser cavity a chemical chain reaction takes place in which molecules of hydrogen or deuterium react with atomic chlorine to produce ground state hydrogen chlorine or deuterium chloride and atomic hydrogen or deuterium. The atomic hydrogen or deuterium, in turn, reacts with the molecular chlorine to produce the lasing species of hydrogen chloride or deuterium chloride and atomic chloride and atomic chlorine. Laser radiation is emitted from the laser cavity transversely to the flow of gases.

5 Claims, 1 Drawing Figure

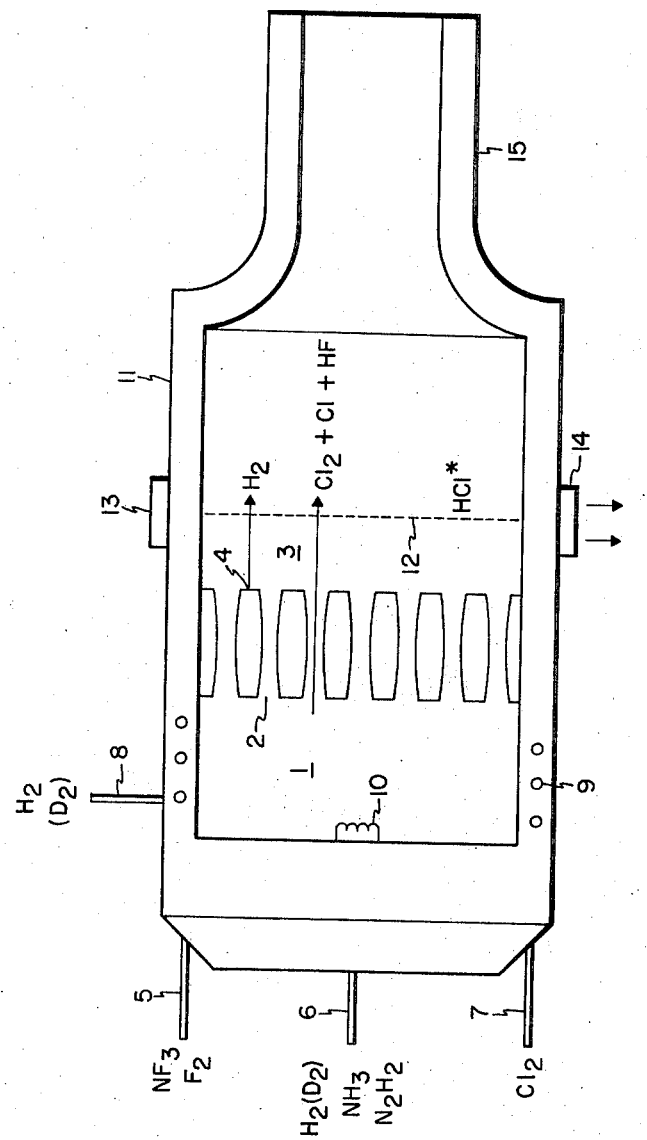

CHAIN REACTION HCL CHEMICAL LASER

BACKGROUND OF THE INVENTION

Airey, in U.S. Pat. No. 3,560,876, teaches a continuous wave chemical laser using HCl and fluorine atoms to produce an HF laser. HCl lasing is produced by the reaction of chlorine atoms with hydrogen iodide or hydrogen bromide. Reactions using hydrogen bromide or hydrogen iodide fail to produce a chain lasing reaction which is desirable for many laser applications. Lasing reactions as proposed by Airey requires a large amount of heat to produce the atoms required. This is undesirable for a practical system.

Bronfin et al., U.S. Pat. No. 3,701,045 teaches a chemical mixing laser using a hydrogen fluoride reaction to drive a hydrogen chloride laser. Bronfin et al., does not teach a chain reaction laser, however, because Bronfin et al, injects a substantial percentage of free atoms of hydrogen into the lasing cavity. In addition, large quantities of heat are required in order to achieve a large number of hydrogen atoms necessary for lasing.

In Bronfin's non-chain systems, such as $HI-Cl_2$ or $HBr-Cl_2$, dissociation of more or all of the $Cl_2$ is required for efficient operation. Inasmuch as the bond energy of $Cl_2$ is 57 Kcal/mol, nearly complete $Cl_2$ dissociation requires much more energy in a combustion driven laser than does the proposed laser invention. Hydrogen is even more difficult to dissociate efficiently because of a higher bond energy.

SUMMARY OF THE INVENTION

A combustion driven, chain reaction chemical laser is operated using chlorine and hydrogen or deuterium as reactants in the optical cavity. A fluorine-source gas, a hydrogen-source gas, and a chlorine-source gas are injected into a combustion chamber together with or without an inert diluent, creating a continuous reaction which produces temperatures sufficiently high to produce atomic and diatomic chlorine. The products of the combustion are injected into a laser cavity together with hydrogen gas whereby a two-step chain reaction occurs:

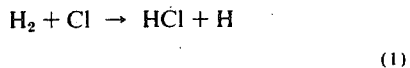

(1)

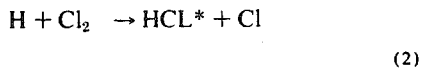

(2)

wherein HCl* denotes the lasing species. The gaseous products are removed from the laser cavity by a cryogenic, ejection, mechanical, or chemical pumping means. The high pressure in the laser cavity achieved with this laser permits recovery of exhaust gases to atmospheric pressure. Because the lasing zone length can be extended, a good quality laser beam can be emitted from the laser cavity in the $4\mu$ wavelength region with the assistance of mirrors which are situated transversely to the gaseous flow. The combustion driven hydrogen chloride laser of this invention provides a means to produce a compact continuous wave laser which has good chemical efficiency and is substantially independent of any external power requirements.

BRIEF DESCRIPTION OF THE DRAWINGS

The FIGURE in the drawing represents a cross-sectional view in schematic form of an apparatus suitable for use in this invention.

DESCRIPTION OF THE PREFERRED EMBODIMENTS

The present invention provides a relatively safe, efficient gaseous chain-reactant system for use in combustion driven continuous wave chemical laser. Hydrogen and chlorine are attractive reactants for lasers because the kinetics are slow, that is, the pumping or the collisional process that produces excited HCl* by chain reaction, and the deactivation or the decay of exicited HCl* by collisions to the ground state energy level, are slower. The slower kinetics of the reaction permits better mixing and higher pressures in the laser cavity than in most current chemical lasers such as those that lase on the HF or DF molecule.

High cavity pressures permit greater power to be achieved in a smaller region, i.e., a higher power density can be obtained and exhaust gas pressure recovery can be achieved to atmospheric pressure or higher. The range of cavity pressures may be between 10 torr and 100 torr. At pressures below 10 torr, the population of excited HCl* species will be insufficient and the efficiency will be poor. At pressures above 100 torr, the gaseous mixing may be poor, resulting in a shorter lasing zone and poor efficiency. Cavity pressures in the range of 50 to 80 torr are preferred.

In the present chain-reaction hydrogen chloride laser, two conditions are important. First, there must be a short chain reaction for the generation of HCl*. This is accomplished by dissociating a moderate percentage of the chlorine. Short chain reaction operation is desirable in order to improve the pumping rate relative to the deactivation rate. A key parameter, designated $\alpha$, may be expressed in mathematical form:

$$\alpha = \dot{m}_{Cl}/\dot{m}_{Cl} + \dot{m}_{Cl_2}$$

where $\dot{m}_{Cl}$ and $\dot{m}_{Cl}$ are the mass flow rates of chlorine atoms and chlorine molecules in the nozzle, respectively. A short chain reaction occurs when $\alpha$ is between 0.1 and 0.5. A long chain reaction occurs when $\alpha$ is small, e.g., about 0.01. Very little, or not, chain reaction occurs when $\alpha$ exceeds 0.5. As will be noted in the following Table I, long chain operation is quite inefficient while short chain operation will have efficiencies in excess of 5 percent. This is because the $Cl + H_2$ reaction controls the rate of production of excited HCl* according to the following reactions:

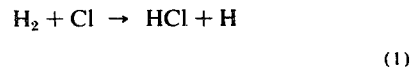

(1)

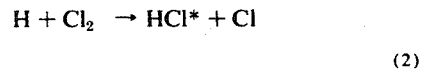

(2)

When the concentration of the chlorine atom is small, as in the long chain case, the slow rate of production of excited HCl* is inadequate to overcome collisional deactivation processes. Thus, in order to achieve efficient laser operation, the combustor should produce chlorine atoms in sufficient quantities that reactions (1) and (2) will cycle at a rapid rate compared to collisional deactivation processes.

TABLE I

| α | Power (kw) | η (efficiency %) |
|---|---|---|
| 0.01 | 0.67 | 0.50 |
| 0.1 | 7.23 | 5.40 |
| 0.15 | 8.37 | 6.27 |
| 0.2 | 9.05 | 6.79 |
| 0.3 | 9.18 | 6.93 |
| 0.4 | 8.84 | 6.70 |
| 0.5 | 8.34 | 6.35 |

The second important condition for efficient operation is achieved when the gain medium is highly saturated. High gain saturation is produced by using a long gain medium length, L, and a high cavity pressure, $p$, with the proper mixture ratios of hydrogen and chlorine. These conditions lead to higher power, in fact, efficiency tends to increase as the power increases.

TABLE II

| $p$ (atm) | L (cm) | Power (kw) | η (efficiency %) |
|---|---|---|---|
| 0.01 | 100 | 0.55 | 4.17 |
| 0.1 | 100 | 9.18 | 6.93 |
| 0.01 | 10 | 0.036 | 0.27 |

The above table shows a severe decrease in efficiency to 0.27 percent when the cavity pressure is 0.01 atmospheres and L is 10 cm. This decrease is due to the reduced small-signal gain and, hence, poor saturation of the medium.

While initial cavity temperature, T, has been previously recognized as a control factor, its importance has not been fully appreciated previously. In the present invention, it has been found that temperatures in the cavity influence the rate of chain reaction, permitting the tailoring of the length of the lasing zone length in the flow direction, $X_c$. The following table shows the dependence of efficiency and $X_c$ upon the initial cavity temperature.

TABLE III

| T (°K) | Power (kw) | η (efficiency %) | $X_c$ (cm) |
|---|---|---|---|
| 200 | 8.20 | 4.12 | 21.9 |
| 300 | 9.18 | 6.93 | 5.3 |
| 400 | 7.81 | 7.85 | 2.2 |
| 500 | 6.69 | 7.15 | 1.3 |

As shown in the table above, maximum efficiency occurs at about 400°K with a sharper drop-off below 300°K. $X_c$, the distance to lasing cut-off, decreases rapidly with increasing T.

Another parameter which influences the efficiency of the HCl laser is $\beta$, defined as the ratio of the molar flow rate of injected cavity fuel to oxidizer. Expressed in mathematical terms:

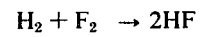

$$\beta = 35.5 \ \dot{m}_{H_2}/\dot{m}_{cl} + \dot{m}_{cl_2}$$

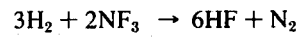

Efficiency of the laser is good above $\beta = 5$, and levels off at about $\beta = 10$. Variations of cavity conditions can be seen from the following table.

TABLE IV

| β | η (efficiency percent) | Specific Power (kw/lb/sec) | $X_c$ (cm) | Percent Chlorine Remaining at Lasing Cut-off |
|---|---|---|---|---|
| 1 | 1.98 | 22.7 | 1.1 | 60.0 |
| 2 | 3.16 | 35.3 | 1.4 | 51.0 |
| 10 | 6.93 | 63.5 | 5.3 | 7.6 |
| 20 | 7.67 | 57.5 | 9.6 | 7.9 |

The rapid efficiency increase when $\beta$ approaches 10 is partly because the increase in the Cl + H$_2$ reaction rate outweighs the H$_2$ deactivation rate. $X_c$ increases with increasing $\beta$ because excess H$_2$ acts as a diluent. Moreover, the more complete utilization of the chlorine during lasing at large $\beta$ results in improved efficiency.

The combustor reactants used in this invention, should give a highly exothermic reaction and produce products which are relatively inert with respect to chlorine atoms and chlorine molecules and which will not deactivate HCl* rapidly in the laser cavity. Fuels which meet these criteria may be most commonly selected from hydrogen, fluorine, and nitrogen trifluoride, giving the following exothermic reactions:

$$H_2 + F_2 \rightarrow 2HF \tag{3}$$

$$3H_2 + 2NF_3 \rightarrow 6HF + N_2 \tag{4}$$

A small amount of hydrogen does not participate in the above reactions, but combines with the chlorine to produce HCl which is fed into the laser cavity. The amount of HCl formed is about 1 percent, or less, which is too small to be deleterious as a deactivator. Proper feed ratios to the combustor comprise stoichiometric amounts of F$_2$ (or NF$_3$) and fuel.

In operating the HCl laser, a chlorine-source gas and a fluorine-source gas are injected into the combustor along with a hydrogen-source gas and, if desired, an inert diluent. The hydrogen-source gas may be selected from, among other possibilities, hydrogen, ammonia, or hydrazine. Deuterium isotopes of the hydrogen-source gases could be used in the combustor, however, economic considerations are limiting. The chlorine-source gas may be selected from, among other possibilities, chlorine, chlorine trifluoride, or chlorine pentafluoride. An inert diluent may be introduced into the combustor and is an optional expedient for the control of temperature. The inert diluent may be selected from, among other possibilities, nitrogen or helium. If an oxidizer, such as nitrogen trifluoride, or a fuel, such as ammonia or hydrazine, is contemplated, additional diluent may not be required, the presence of the nitrogen in the compounds being sufficient in most applications.

Ignition of the gases in the combustor may be required or they may react hypergolically, however, once ignited the gases react continuously. The ignition system for the gases in the combustor may be either a spark plug, a hot glow plug-type ignitor, or a resistive heater which will pre-heat the hydrogen-source gas to temperatures high enough to insure ignition when the hot hydrogen-source gas is mixed with the fluorine-source gas. Temperatures in the range of 400° to 600°C are adequate to insure ignition.

Gases from the combustor are driven through nozzles or orifices into a laser cavity at supersonic velocities whereby they react with a gaseous isotopic form of element atomic number one, such as hydrogen or deuterium gas, which is separately injected into the cavity to form lasing species HCl* or DCl*. The additional hydrogen or deuterium is injected into the laser cavity through secondary orifices or nozzles interspersed between the discharge of the nozzles or orifices from the combustor. The lasing of the HCl* produces radiation in about the 4μ wavelength region which is the characteristic frequency of vibrationally excited HCl*, while lasing of DCl* produces radiation in about the 5.0μ to 5.6μ wavelength region. Good atmospheric transmission is achieved in some of these wavelength regions.

The important reactions may be represented as follows:
In the combustor:

$$F_2 + H_2 \rightarrow 2HF \quad (5)$$

In the laser cavity:

$$H_2 + Cl \rightarrow HCl + H \quad (6)$$

$$H + Cl_2 \rightarrow HCl^* + Cl \quad (7)$$

or $$D_2 + Cl \rightarrow DCl + H \quad (8)$$

$$D + Cl_2 \rightarrow DCl^* + Cl \quad (9)$$

Following the lasing action the gases are quickly removed from the laser cavity by ejection, mechanical, chemical, or cryogenic pumping. The chemical laser of the present invention enables a reaction temperature in the combustor of over 1,700°K to be attained easily. Because the combustion and dissociation of the chlorine bearing oxidizer takes place in a single chamber, the design of the present laser is simplified. Furthermore, because the combustion reaction energy is not transferred across walls, the combustion chamber walls can be cooled without deleterious effect on the production of atomic chlorine in the combustor. For long periods of continuous wave operation, cooling is desirable to avoid a reaction between the corrosive gases and the combustor walls.

Referring to the drawing, the chemical laser is shown schematically, comprising combustor 1 having inlet ports 5, 6, and 7 for reactants fluorine-source gas, hydrogen-source gas, and chlorine-source gas, respectively. In certain embodiments of this invention, if an inert diluent gas is desired, it may be introduced into the combustor or cavity by a separate port or by mixing with one of the feed gases. When a gas, such as nitrogen trifluoride, is used as the fluorine-source gas, it provides the inherent inclusion of nitrogen as a diluent. Inlet port 8 permits hydrogen or deuterium gas to pass through cooling coils 9 to remove heat from the combustor walls prior to injection into the laser cavity through ports 4 situated between nozzles or orifices 2 through which the gaseous products of the combustor pass.

If required, initiator 10 can be situated in combustor 1 to provide a starting means for the reaction gases which are stable at ordinary temperatures. If spark plug or glow plug-type initiator 10 is not desired, then the reactant gases may be heated by some external means, e.g., an electrical resistive heater or gas generator creating heat from the autodecomposition of hydrazine. Cooling coils 9 are disposed about the outer pheriphery of combustor 1 and provide a cooled wall contact with the combustor reactants. Other cooling techniques and materials may be employed to cool the combustor. For example, in addition to passing the hydrogen or deuterium gas through cooling coils 9, a liquid cooling medium could be passed through the coils, or the coils could be replaced by fins to provide air cooling. It should be understood that if the heat load on the combustor walls is too great to be handled by the hydrogen or deuterium gas alone, separate secondary coils may be added to carry supplemental liquid or gaseous coolants. Cavity injection nozzles 2 provide for chlorine atoms and molecules in a heated condition to exit from the combustor and combine with the hydrogen or deuterium gas injected into the laser cavity so that vibrationally excited HCl* or DCl* molecules are generated. Exhaust manifold 11 is mounted centrally and axially of combustor 1 and defines laser cavity 3 immediately adjacent to nozzles or orifices 2. Lasing action occurs along lasing axis 12 transverse to the gas flow introduced into the laser cavity from combustor 1 and the hydrogen or deuterium injected directly into laser cavity 3 through ports 4. Rear mirror 13 and output mirror 14 are provided on opposite sides of cavity 3 for amplifying and emitting laser radiation produced in cavity 3 by the stimulation of the vibrationally excited HCl* or DCl* molecules. Rear mirror 13 and output mirror 14 comprise polished and configured mirrors which may vary in size and configuration according to the size and configuration of laser cavity 3. In addition, the cavity may be used in the amplifier mode of operation wherein an input beam is selectively amplified by the excited HCl* or DCl* molecules.

In a typical lasing operation, the combustor attains temperatures from 1,600° to 2,000°K and the chlorine bearing compound is dissociated into chlorine atoms and diatomic chlorine. The pressure range in the combustor is typically 1 psia to 300 psia. The combustor gases then flow through nozzles or orifices 2, being expanded to supersonic velocities and injected into laser cavity 3 where hydrogen is injected, forming HCl* or DCl* which produces the lasing radiation. Pressures in laser cavity 3 are typically maintained at about 10 to 100 torr which is suitable for lasing action. Static temperatures of the supersonic flow in laser cavity 3 at the entrance to the cavity may vary from about 300° to 700°K. Generally, exhaust gases emerging from laser cavity 3 are passed along exhaust manifold 11 and, if desired, through a constricted portion 15 which functions as a venturi or diffuser to permit pressure recovery further downstream. The exhaust gases may be ejected into the atmosphere or pumped by mechanical, chemical, or cryogenic means and partially or wholly recovered.

I claim:
1. A method of producing laser energy comprising:

A. igniting a mixture of an inorganic hydrogen-source gas and an inorganic fluorine-source gas in a combustion chamber;

B. continuously feeding reactants comprising an inorganic hydrogen-source gas and an inorganic fluorine-source gas into said chamber whereby hydrogen fluoride molecules are produced together with chlorine atoms and molecules;

C. driving said gaseous reactants into a lasing cavity;

D. separately introducing a stoichiometric excess of gaseous element atomic number one selected from the group consisting of hydrogen and deuterium into said cavity whereby a short chain reaction occurs between said gaseous element and chlorine at pressures of from 10 torr to 100 torr to produce excited molecules which emit laser radiation;

E. removing gaseous products of reaction from said cavity; and

F. directing laser radiation emitted from said cavity.

2. A process according to claim 1 wherein said hydrogen-source is selected from the group consisting of hydrogen, hydrazine, and ammonia.

3. A process according to claim 1 wherein said fluorine-source is selected from the group consisting of fluorine and nitrogen trifluoride.

4. A process according to claim 1 wherein said chlorine-source is selected from the group consisting of chlorine, chlorine trifluoride, and chlorine pentafluoride.

5. A process according to claim 1 wherein said cavity pressures are from 50 to 80 torr.

* * * * *